(12) United States Patent
Mullen et al.

(10) Patent No.: US 8,691,309 B2
(45) Date of Patent: Apr. 8, 2014

(54) REDUCTION OF SORBIC ACID PRECIPITATION

(75) Inventors: Jessica Mullen, New Milford, CT (US); Winsome Johnson, Ossining, NY (US); Peter Given, Ridgefield, CT (US); Rama Gadiraju, Port Chester, NY (US); Siow Ying Tan, Thornwood, NY (US); Cynthia Clark, Yorktown Heights, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 13/033,777

(22) Filed: Feb. 24, 2011

(65) Prior Publication Data

US 2012/0219678 A1    Aug. 30, 2012

(51) Int. Cl.
  *A23F 3/16*    (2006.01)
(52) U.S. Cl.
  USPC ..................................... 426/330.3
(58) Field of Classification Search
  None
  See application file for complete search history.

(56) References Cited

U.S. PATENT DOCUMENTS

| | | | |
|---|---|---|---|
| 3,021,219 A * | 2/1962 | Melnick | 426/310 |
| 4,399,150 A | 8/1983 | Ueno et al. | |
| 4,786,521 A | 11/1988 | Bennett et al. | |
| 5,888,569 A | 3/1999 | Jager et al. | |
| 6,126,980 A | 10/2000 | Smith et al. | |
| 2004/0086619 A1 * | 5/2004 | Zhong et al. | 426/590 |
| 2005/0053704 A1 | 3/2005 | Kemp | |
| 2007/0054026 A1 | 3/2007 | Grenville et al. | |
| 2007/0141203 A1 | 6/2007 | Cook | |
| 2007/0275140 A1 | 11/2007 | Safko | |
| 2009/0306210 A1 | 12/2009 | Behnam | |

FOREIGN PATENT DOCUMENTS

| | | |
|---|---|---|
| CN | 101810361 A | 8/2010 |
| DE | 26 23 682 | 12/1976 |
| WO | 9721359 | 6/1997 |
| WO | WO 2006029896 A1 * | 3/2006 |

OTHER PUBLICATIONS

Stopforth, JD; Stofos, JN; and Busta, FF. "Sorbic Acid and Sorbates" in Antimicrobials in Food. Davidson, PM; Stofos, JN Branen, AL. ed. Taylor & Francis Inc. 2005; pp. 49-90.*
Database WPI Week 201063, Thomson Scientific AN 2010-L68981, XP002676321, dated Aug. 25, 2010.
PCT/US2012/025338, International Search Report and Written Opinion, dated May 31, 2012.
U.S. Appl. No. 13/034,023, Final Office Action mailed Sep. 6, 2012.
U.S. Appl. No. 13/033,758, Final Office Action, mailed Oct. 24, 2013.
U.S. Appl. No. 13/034,097, Office Action mailed Oct. 23, 2012.

* cited by examiner

*Primary Examiner* — Humera Sheikh
*Assistant Examiner* — Subbalakshmi Prakash
(74) *Attorney, Agent, or Firm* — Banner & Witcoff, Ltd.

(57) ABSTRACT

A method for reducing sorbic acid precipitation during manufacture and storage of stable preserved syrup. A sorbic acid compound is dissolved in an oil-based ingredient of the syrup. Syrup ingredients are added to a bulk quantity of liquid, and a sorbic acid compound-containing oil-based ingredient is added to the liquid.

7 Claims, No Drawings

REDUCTION OF SORBIC ACID PRECIPITATION

FIELD OF THE INVENTION

The invention relates to a method for incorporating sorbic acid into beverages and beverage syrup. In particular, the method relates to a method for incorporating sorbic acid into beverages and beverage syrup while minimizing the potential for sorbic acid precipitation.

BACKGROUND OF THE INVENTION

Consumer demand for refreshing beverages has led to introduction of many types of beverages. Commercial distribution of beverages requires that the beverages, and syrup from which beverages are made, be protected from spoilage if not consumed or used upon manufacture.

Beverages can be maintained under conditions that significantly retard activity of microbial and other spoilage agents, such as bacteria, molds, and fungi. Such conditions often require, for example, refrigeration until the beverage or syrup is consumed. Maintenance of such conditions often is not possible or practical.

Another method of retarding microbial activity is to add preservatives to the beverage. Many preservatives are known. However, known preservatives typically have disadvantages that limit use in beverages. For example, preservatives may impart off taste to the beverage when used in a concentration sufficient to provide preservative effect. Preservatives also may adversely affect the appearance of the beverage.

Some preservatives precipitate or form crystals or a floc under conditions of manufacture or storage of a beverage or of a syrup from which a beverage is made. Some preservatives may cloud the beverage, which is unacceptable to the consumer if the beverage is expected to be clear. Such phenomena typically are unacceptable consumers not only because of certain preconceptions relating to appearance, but also because consumers often equate cloud or particulate formation with spoilage of the beverage. Floc, crystals, or sediment or sediment-like deposits in a beverage bottle also are unacceptable to consumers because the solids typically taste bad and present an unpleasant mouthfeel (for example, a gritty or sandy mouthfeel).

Beverages often are made from concentrates that are diluted. Beverages then are provided immediately to a consumer, or are packaged for distribution and consumption. The concentrates, often called syrups, are conveniently shipped, and then used to make beverages in a one-step process. Thus, it is convenient to put all ingredients, including preservatives, into a syrup. However, because syrup is concentrated, it often is not possible to introduce sorbic acid without precipitation.

Thus, there exists a need for a preservative that does not form solids, such as floc, crystals, sediment or sediment-like deposits, or precipitates, in syrup. There also exists a need for a preservative that does not cloud an optically clear beverage. There also exists a need for a method of introducing such a preservative without inducing precipitation thereof.

BRIEF SUMMARY OF THE INVENTION

A first embodiment of the invention is directed to a method for forming a stable beverage syrup preserved with sorbic acid. In another embodiment of the invention, the stable preserved syrup has a shelf life of at least about three days, and up to about 20 weeks, at room temperature.

A third embodiment of the invention is directed to a method for forming a stable beverage preserved with sorbic acid. In another embodiment of the invention, the stable preserved beverage has a shelf life of at least about 20 weeks at a temperature between about 40° F. and about 110° F.

DETAILED DESCRIPTION OF THE INVENTION

As used herein, "syrup" or "beverage syrup" is a beverage precursor to which a fluid, typically water, is added to form a ready-to-drink beverage, or a "beverage." Typically, the volumetric ratio of syrup to water is between about 1:3 to about 1:8, more typically between about 1:4 and about 1:5. The volumetric ratio of syrup to water also is expressed as a "throw." A 1:5 ratio, which is a ratio commonly used within the beverage industry, is known as a "1+5 throw."

As used herein, "beverage" refers to beverages such as soft drinks, fountain beverages, frozen ready-to-drink beverages, coffee beverages, tea beverages, sport drinks, and alcoholic products. The beverage may be carbonated or noncarbonated. In addition, in certain embodiments of the invention, "beverage" refers also to juice, dairy, and other non-clear beverages. Beverages according to embodiments of the invention can be clear or non-clear.

"Clear" refers to optical clarity, i.e., a clear beverage can be as clear as water. In a preferred embodiment of the present invention, the beverage concentrate and/or the finished beverage are clear as evidenced by a reading by a HACH Turbidimeter (Model 2100AN, Hach Company, Loveland, Colo.). Readings of up to about 3 NTU (Nephelometric Turbidity Units) are considered very clear, and values up to about 5 NTU can be considered clear. When such a reading is as high as around 6 to about 10 NTU, a sample is not clear, but rather very slightly hazy or slightly hazy. At about 15 NTU, a beverage is hazy. Thus, a beverage having turbidity not greater than about 5 NTU is said to be a clear beverage, with values of about 6 NTU being very slightly hazy to slightly hazy at 10 NTU.

As used herein, a "stable" beverage syrup refers to a syrup in which no phase separation occurs, i.e., no crystal, floc, sediment, haze, cloud, or precipitation at room temperature over a period of more than 3 days, and as long as 10, or more typically, 20 weeks. As used herein, a "stable" finished beverage refers to a clear beverage in which no phase separation occurs, i.e., no crystal, floc, sediment, haze, cloud, or precipitation at room temperature at 40° F., 70° F., 90° F., and 110° F. over a period of 4 weeks, typically over a period of 20 weeks, and more typically more than 6 months, i.e., within the typical shelf-life of the finished beverage.

A "preserved" beverage shows no significant microbiological activity during the period of stability.

As typically used herein, "water" is water, typically conditioned and treated, of a quality suitable for manufacturing beverages. Excessive hardness may induce precipitation of sorbic acid. With the guidance provided herein, the skilled practitioner will be able to provide water of sufficient quality.

"Fluid" means water and juice, dairy, or other liquid beverage products that form part of beverages. For example, dairy components may be added in quantity that does not provide sufficient hardness to induce sorbic acid precipitation. With the guidance provided herein, the skilled practitioner can determine whether addition of dairy, juice or other liquid beverage product is suitable for use in embodiments of the invention.

For brevity, the invention will be described as it relates to water as the fluid. However, the description herein also relates to fluid, as defined herein. With the guidance provided herein, the skilled practitioner will be able to provide fluids suitable for use in forming syrup.

Beverages and syrups made in accordance with embodiments of the invention typically comprise water, preservative (including sorbic acid), sweetener, pH-neutral compounds, acids and acidic compounds, and flavors and flavor compounds. These compounds typically include taste modifiers, nutrients, colors, and other compounds, such as emulsions, surfactants, buffers, and anti-foaming compounds, typically found in beverages.

Sorbic acid and sorbates act as preservatives. However, at the pH levels typically found in syrups, and at a typical sorbate concentration in syrup sufficient to provide commercially useful preservative activity in beverages made therefrom, sorbic acid is likely to precipitate unless steps are taken to avoid precipitation.

The inventors have discovered that precipitation of sorbic acid in syrup during manufacture of the syrup and the beverage can be avoided by dissolving a sorbic-acid compound in an oil-based ingredient, which then is added to the syrup. As used herein, a sorbic acid compound is a compound or composition that contains sorbic acid or is converted to or liberates sorbic acid under conditions found during syrup and beverage manufacture. In particular, sorbic acid typically is introduced as a sorbate, typically as an alkali metal salt of sorbic acid. Typically-used alkali metals are sodium and potassium. In a more typical embodiment of the invention, potassium sorbate is used. Although the inventors do not wish to be bound by theory, it is believed that the oil-based ingredient ameliorates local conditions, such as a locally low pH, that induce sorbic acid precipitation.

Some of the ingredients of beverages and syrups are oil-based or include an oil-based ingredient. For example, some nutrients, such as tocopherols (Vitamin E) and tocotrienols, are oil-based ingredients. Also, many flavors and flavor compounds are oil-based or include an oil-based ingredient. As the skilled practitioner recognizes, citrus flavors, such as lemon, lime, lemon/lime, orange, grapefruit, and the like, often have an oil-based ingredient.

Other ingredients that may have an oil-based ingredient include antioxidants, such as TBHQ, BHA, and BHT. With the guidance provided herein, the skilled practitioner will be able to identify a suitable oil-based ingredient into which the sorbic acid component is suitably dissolved.

The concentration of sorbic acid in the beverage typically is less than about 500 ppm. The concentration of sorbic acid in the syrup typically is less than about 1300 ppm. In aqueous solution at pH of between about 2.5 and about 4 at about 20° C., which are typical manufacturing conditions for beverages and syrups, sorbic acid precipitation begins at sorbate concentration of about 500 ppm, unless steps are taken to preclude precipitation, and at 1300 ppm, the tendency to precipitate is clear. Further, as the skilled practitioner recognizes, other compounds in the beverage or syrup may also affect sorbic acid solubility adversely. For example, hardness lowers the solubility of sorbic acid. Therefore, addition of sorbate in accordance with embodiments of the invention is contemplated at a wide range of sorbic acid concentrations while essentially precluding sorbic acid precipitation.

The concentration of sorbic acid required to achieve commercial preservation conditions also relates to other conditions of the syrup or beverage. For example, carbonation will decrease the concentration of sorbic acid required to achieve a given preservation performance. In contradistinction, lowering the pH lowers the concentration of sorbic acid required to achieve a given preservation performance. With the guidance provided herein, the skilled practitioner will be able to establish a sorbic acid concentration that suitably preserves a syrup or beverage.

In accordance with embodiments of the invention, syrup and beverages include sorbic acid as preservative. Other preservatives are known to the skilled practitioner, and may be included with the sorbic acid. Other preservatives include, for example, chelators, such as the EDTA's, including disodium EDTA, calcium disodium EDTA, and SHMP; antimicrobials such as benzoates, particularly the alkali metal benzoates; and antioxidants, including tocopherols, BHA, and BHT. In accordance with embodiments of the invention, other preservatives are used sparingly, and most typically not at all. With the guidance provided herein, the skilled practitioner will be able to select appropriate preservatives.

Sweeteners of beverage and syrup embodiments of the invention include caloric carbohydrate sweeteners, natural high-potency sweeteners, synthetic high-potency sweeteners, other sweeteners, and combinations thereof. With the guidance provided herein, a suitable sweetening system (whether a single compound or combination thereof) can be selected.

Examples of suitable caloric carbohydrate sweeteners include sucrose, fructose, glucose, erythritol, maltitol, lactitol, sorbitol, mannitol, xylitol, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, xylo-oligosaccharides (xylotriose, xylobiose and the like), gentio-oligoscaccharides (gentiobiose, gentiotriose, gentiotetraose and the like), galacto-oligosaccharides, sorbose, nigero-oligosaccharides, fructooligosaccharides (kestose, nystose and the like), maltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (e.g., HFCS55, HFCS42, or HFCS90), coupling sugars, soybean oligosaccharides, and glucose syrup.

Other sweeteners suitable for use in embodiments provided herein include natural, synthetic, and other high-potency sweeteners. As used herein, the phrases "natural high-potency sweetener," "NHPS," "NHPS composition," and "natural high-potency sweetener composition" are synonymous. "NHPS" means any sweetener found in nature which may be in raw, extracted, purified, treated enzymatically, or any other form, singularly or in combination thereof and characteristically has a sweetness potency greater than sucrose, fructose, or glucose, yet has fewer calories. Non-limiting examples of NHPS's suitable for embodiments of this invention include rebaudioside A, rebaudioside B, rebaudioside C (dulcoside B), rebaudioside D, rebaudioside E, rebaudioside F, dulcoside A, rubusoside, stevia, stevioside, mogroside IV, mogroside V, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobtain, baiyunoside, osladin, polypodoside A, pterocaryoside A, pterocaryoside B, mukurozioside, phlomisoside I, periandrin I, abrusoside A, and cyclocarioside I.

NHPS also includes modified NHPS's. Modified NHPS's include NHPS's which have been altered naturally. For example, a modified NHPS includes, but is not limited to, NHPS's which have been fermented, contacted with enzyme, or derivatized or substituted on the NHPS. In one embodiment, at least one modified NHPS may be used in combination with at least one NHPS. In another embodiment, at least one modified NHPS may be used without a NHPS. Thus, modified NHPS's may be substituted for a NHPS or may be used in combination with NHPS's for any of the embodiments described herein. For the sake of brevity, however, in the description of embodiments of this invention, a modified NHPS is not expressly described as an alternative to an unmodified NHPS, but it should be understood that modified NHPS's can be substituted for NHPS's in any embodiment disclosed herein.

As used herein, the phrase "synthetic sweetener" refers to any composition that is not found in nature and is a high potency sweetener. Non-limiting examples of synthetic sweeteners suitable for embodiments of this invention include sucralose, acesulfame potassium (acesulfame K or aceK) or other salts, aspartame, alitame, saccharin, neohesperidin dihydrochalcone, cyclamate, neotame, N-[3-(3-hydroxy-4-methoxyphenyl)propyl]-L-α-aspartyl]-L-phenylalanine 1-methyl ester, N-[3-(3-hydroxy-4-methoxyphenyl)-3-methylbutyl]-L-α-aspartyl]-L-phenylalanine 1-methyl ester, N-[3-(3-methoxy-4-hydroxyphenyl)propyl]-L-α-aspartyl]-L-phenylalanine 1-methyl ester, and salts thereof.

Acids suitably used in embodiments of the invention include food grade acids typically used in beverages and beverage syrups. Buffers include salts of food grade acids that form pH buffers, i.e., provide a combination of compounds that tends to maintain the pH at a selected level. Food acids for use in particular embodiments include, but are not limited to, phosphoric acid, citric acid, ascorbic acid, adipic acid, fumaric acid, lactic acid, malic acid, tartaric acid, acetic acid, oxalic acid, tannic acid, caffeotannic acid, and combinations thereof.

Flavors routinely used in beverages and syrups are suitably used in beverages and syrups that are embodiment of the invention. The skilled practitioner recognizes that some flavors will haze or add a cloudy appearance to a beverage. Therefore, such a flavor, which often may be an emulsion, would not be suitably used in a clear beverage. Suitable flavors include flavors typically used in beverages and syrup that are not incompatible with the type of beverage. That is, a clear beverage would not typically be flavored with a flavor that would cloud the beverage, introduce haze, or otherwise make the beverage less attractive to the consumer. However, subject to this condition known to the skilled practitioner, known flavors suitably are used, as appropriate.

Any flavor, flavor compound, or flavor system consistent with the type of beverage suitably is used in embodiments of the invention. Further, the flavor may be in any form, such as powder, emulsion, micro-emulsion, and the like. Some of these forms may induce clouding in a beverage, and so would not be used in a clear beverage. Typical flavors include almond, amaretto, apple, sour apple, apricot, nectarine, banana, black cherry, cherry, raspberry, black raspberry, blueberry, chocolate, cinnamon, coconut, coffee, cola, cranberry, cream, irish cream, fruit punch, ginger, grand marnier, grape, grapefruit, guava, grenadine, pomegranate, hazelnut, kiwi, lemon, lime, lemon/lime, tangerine, mandarin, mango, mocha, orange, papaya, passion fruit, peach, pear, peppermint, spearmint, pina colada, pineapple, root beer, birch beer, sarsaparilla, strawberry, boysenberry, tea, tonic, watermelon, melon, wild cherry, and vanilla. Exemplary flavors are lemon-lime, cola, coffee, tea, fruit flavors of all types, and combinations thereof.

Surfactants also may be present in the syrup or beverage. Surfactant may be added as an ingredient of the syrup. The skilled practitioner recognizes that surfactant also may be introduced into the syrup or beverage as part of a component ingredient.

Surfactants typically suitable for use in embodiments of this invention include, but are not limited to, the polysorbates (e.g., polysorbate 20, polysorbate 40, polysorbate 60, polysorbate 80), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers.

The skilled practitioner recognizes that, if a temperature higher than ambient temperature is used during syrup manufacture, the temperature of the syrup may be reduced after the product is complete, or, typically, after acidification and before volatile materials are added. Typically, beverage syrup is made by adding ingredients to a bulk quantity of water. The water typically is at a temperature of at least about 50° F. and typically less than about 200° F., commonly between about 50° F. and about 130° F.

The skilled practitioner recognizes that ingredients can be added singularly or in combination. Also, solutions of dry ingredients can be made and used to conveniently add ingredients to the bulk quantity of water.

Ingredients typically are added to the bulk quantity of water in an order that minimizes potential adverse interactions between ingredients or potential adverse effect on an ingredient. For example, nutrients that are temperature-sensitive might be added during a relatively low-temperature portion toward the end of the manufacturing process. Similarly, flavors and flavor compounds often are added just before completion of the syrup to minimize potential loss of volatile components and to minimize flavor loss in any form. Often, acidification is one of the last steps, often carried out before temperature-sensitive, volatile, and flavor materials are added. Thus, flavors or flavor components or other volatile materials and nutrients typically are added at an appropriate time and at an appropriate temperature. With the guidance provided herein, the skilled practitioner can identify an appropriate time to introduce flavor and other volatile materials.

Any of these or other orders of ingredient addition are suitably used, as the order in which ingredients are added can be determined by the skilled practitioner with the guidance provided herein. Thus, the sorbic acid compound dissolved in an oil-based ingredient can be added to the bulk solution at any time.

The resulting syrup is packaged and may be stored. Syrup may be used essentially immediately to manufacture beverages, which typically are packaged for distribution. Syrup may be distributed to bottlers, who package beverages made by addition of water and perhaps other materials like carbonation. Typically, the throw is 1+5. Syrup also typically is sold to those who mix the syrup with throw water, and perhaps other ingredients, such as carbonation, for immediate consumption. One example of such a preparation is a 'fountain soft drink.'

Other embodiments of the invention are directed to manufacture of stable preserved ready-to-drink beverages. Such beverages are made by mixing an aliquot of syrup with an appropriate quantity of diluting water. Typically, the ratio of 1 volume of syrup with 5 volumes of water or other fluid, also known as a "1+5 throw", is used.

Syrup embodiments of the invention are stable beverage syrups preserved with sorbic acid having a shelf life of at least about three days at room temperature. More typically, syrup embodiments of the invention have a shelf life of at least about 7 days, and even more typically at least about 20 weeks.

Beverage embodiments of the invention are stable beverages preserved with sorbic acid having a shelf life of at least about four weeks at a temperature between about 40° F. and about 110° F. More typically, beverage embodiments of the invention have a shelf life of at least about 6 weeks, and even more typically at least about 20 weeks.

The following example illustrates, but does not limit, the invention.

EXAMPLE 1

Lemon lime flavored syrup, and beverages made therefrom using 1+5 throw, are made. A bulk quantity of water at a temperature between about 50° F. and 200° F. is charged to a stirred tank and agitation is started.

Ingredients such as buffers, sweeteners, anti-foam agents, and nutrients are added to the bulk quantity of water. The ingredients are added as solid, liquid, solution, emulsion, or in any form. Acids then are added to the bulk solution with continuing agitation.

Potassium sorbate is dissolved in the lemon lime flavor, which contains oil-based materials. The quantity of sorbate added is sufficient to provide a sorbate concentration of 0.12 weight percent in the syrup.

The temperature of the bulk solution is lowered to less than about 120° F., if necessary, and the lemon lime flavor containing potassium sorbate is added with continuing agitation. After thorough blending, additional top-off water required to achieve the desired volume is added and agitation continues until the syrup is thoroughly mixed. The syrup then is cooled to ambient temperature, if necessary.

Syrup thus prepared is a clear syrup for a fresh-tasting beverage. The syrup is stored at room temperature for 7 days. The syrup remains clear and without any solid precipitate, sediment, crystal, floc, cloud, or haze.

An aliquot of syrup thus prepared is diluted with 5 aliquots of throw water ("1+5 throw") to produce fresh-tasting lemon lime flavored clear beverage. The beverage is stored at room temperature for 16 weeks, and remains clear and without any solid precipitate, sediment, crystal, floc, cloud, or haze.

EXAMPLE 2

A cola-flavored syrup and beverage are made essentially in accordance with the method used in Example 1, except that potassium sorbate first is blended with cola flavor containing tocopherol and then is added to the syrup at any time during the process.

Syrup thus prepared is a dark syrup for a refreshing cola-tasting beverage. The syrup is stored at room temperature for 7 days. The syrup is without any solid precipitate, sediment, crystal, floc, cloud, or haze throughout the storage period.

An aliquot of syrup thus prepared is diluted with 5 aliquots of throw water ("1+5 throw") to produce refreshing cola-flavored beverage. The beverage is stored at room temperature for 16 weeks, and is without any solid precipitate, sediment, crystal, floc, cloud, or haze throughout the storage period.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, the oil-based ingredient is TBHQ, BHT, or BHA in embodiments of the invention.

We claim:

1. A method for reducing sorbic acid precipitation during manufacture and storage of stable preserved syrup, said method comprising
    (a) forming a sorbic acid compound-containing oil-based ingredient consisting of dissolving a sorbic acid compound selected from the group consisting of sorbic acid and compounds that are converted to or liberate sorbic acid under conditions found during syrup and beverage manufacture, and blends thereof, in an oil-based ingredient of the syrup selected from the group consisting of oil-based nutrients, oil-based flavors and flavor compounds, oil-based anti-oxidants, and blends thereof,
    (b) separately combining syrup ingredients in a bulk quantity of liquid wherein the ingredients are selected from the group consisting of acids, buffers, sweeteners, surfactants, anti-foaming agents, colors, taste modifiers, nutrients, and mixtures thereof, and
    (c) then adding the sorbic acid compound-containing oil-based ingredient to the liquid to form the stable preserved syrup, wherein the concentration of sorbic acid in the syrup is less than about 1300 ppm.

2. The method of claim 1, wherein the sorbic acid compound is selected from the group consisting of sorbic acid, alkali metal salts of sorbic acid, and blends thereof.

3. The method of claim 1, wherein the oil-based ingredient is selected from the group consisting of tocopherols, tocotrienols, citrus flavors, TBHQ, BHT, BHA, and blends thereof.

4. The method of claim 1, wherein the oil-based ingredient is selected from the group consisting of tocopherols, tocotrienols, citrus flavors, TBHQ, BHT, BHA, and blends thereof.

5. A method for reducing sorbic acid precipitation during manufacture and storage of a stable preserved beverage prepared by diluting stable preserved syrup, said method comprising
    (a) forming a stable preserved syrup by
        (1) forming a sorbic acid compound-containing oil-based ingredient consisting of dissolving a sorbic acid compound selected from the group consisting of sorbic acid and compounds that are converted to or liberate sorbic acid under conditions found during syrup and beverage manufacture, and blends thereof, in an oil-based ingredient of the syrup selected from the group consisting of oil-based nutrients, oil-based flavors and flavor compounds, oil-based anti-oxidants, and blends thereof,
        (2) separately combining syrup ingredients in a bulk quantity of liquid wherein the ingredients are selected from the group consisting of acids, buffers, sweeteners, surfactants, anti-foaming agents, colors, taste modifiers, nutrients, and mixtures thereof and, wherein the concentration of sorbic acid in the syrup is less than about 1300 ppm,
        (3) then adding the sorbic acid compound-containing oil-based ingredient to the liquid to form the stable preserved syrup, and
    (b) mixing the stable preserved syrup with fluid in a quantity sufficient to make the stable preserved beverage, wherein the concentration of sorbic acid in the beverage is less than about 500 ppm.

6. The method of claim 5, wherein the sorbic acid compound is selected from the group consisting of sorbic acid, alkali metal salts of sorbic acid, and blends thereof.

7. The method of claim 5, wherein the oil-based ingredient is selected from the group consisting of tocopherols, tocotrienols, citrus flavors, TBHQ, BHT, BHA, and blends thereof.

\* \* \* \* \*